United States Patent
Jenkins et al.

(10) Patent No.: US 9,130,692 B2
(45) Date of Patent: Sep. 8, 2015

(54) RECONFIGURABLE OPTICAL ADD/DROP MULTIPLEXER NETWORK ELEMENT FOR C-BAND AND L-BAND OPTICAL SIGNALS

(75) Inventors: David William Jenkins, North Aurora, IL (US); Julia Y. Larikova, Naperville, IL (US); Richard C. Younce, Yorkville, IL (US)

(73) Assignee: Coriant Operations, Inc., Naperville, IL (US)

(*) Notice: Subject to any disclaimer, the term of this patent is extended or adjusted under 35 U.S.C. 154(b) by 404 days.

(21) Appl. No.: 13/453,416

(22) Filed: Apr. 23, 2012

(65) Prior Publication Data
US 2013/0279908 A1    Oct. 24, 2013

(51) Int. Cl.
*H04J 14/00*    (2006.01)
*H04J 14/02*    (2006.01)

(52) U.S. Cl.
CPC .......... *H04J 14/0204* (2013.01); *H04J 14/0212* (2013.01); *H04J 14/0217* (2013.01)

(58) Field of Classification Search
CPC .......... H04Q 11/0005; H04Q 11/0062; H04Q 2011/0016; H04Q 2011/0083; H04Q 2011/0009; H04Q 2011/0039; H04Q 2011/0079; H04Q 11/0003; H04Q 2011/0015; H04Q 2011/0024; H04Q 2011/0032; H04Q 2011/0052; H04J 14/0204; H04J 14/0212; H04J 14/0217
USPC ................................... 398/83, 48, 45, 49, 81
See application file for complete search history.

(56) References Cited

U.S. PATENT DOCUMENTS

| | | | |
|---|---|---|---|
| 7,653,311 B2* | 1/2010 | Kikuchi et al. | 398/83 |
| 8,494,360 B2* | 7/2013 | Chen | 398/16 |
| 8,644,710 B2* | 2/2014 | Wellbrock et al. | 398/83 |
| 8,744,262 B2* | 6/2014 | Barnard | 398/49 |
| 8,855,494 B2* | 10/2014 | Wellbrock et al. | 398/83 |
| 2002/0044324 A1* | 4/2002 | Hoshida et al. | 359/179 |
| 2002/0048066 A1* | 4/2002 | Antoniades et al. | 359/128 |
| 2002/0105692 A1* | 8/2002 | Lauder et al. | 359/124 |
| 2002/0154359 A1* | 10/2002 | Tsuda et al. | 359/124 |
| 2002/0197049 A1* | 12/2002 | Baniel et al. | 385/142 |
| 2003/0118274 A1* | 6/2003 | Nishi et al. | 385/17 |
| 2003/0185488 A1* | 10/2003 | Blumenthal | 385/16 |
| 2005/0226621 A1* | 10/2005 | Kikuchi et al. | 398/83 |
| 2007/0237524 A1* | 10/2007 | Gerstel et al. | 398/83 |
| 2008/0260386 A1* | 10/2008 | Boduch et al. | 398/83 |
| 2009/0034974 A1* | 2/2009 | Grubb | 398/68 |
| 2009/0041457 A1* | 2/2009 | Maki et al. | 398/45 |

(Continued)

OTHER PUBLICATIONS

Bo Zhang, Christian Malouin, Samuel Liu, and Theodore J. Schmidt Penalty-Free Transmission of 127-Gb/s Coherent PM-QPSK over 1500-km of NDSF with 10 Cascaded 50-GHz ROADMs OSA / OFC/NFOEC 2010.*

(Continued)

*Primary Examiner* — Ken Vanderpuye
*Assistant Examiner* — Abbas H Alagheband
(74) *Attorney, Agent, or Firm* — Fitzpatrick, Cella, Harper & Scinto (57) ABSTRACT

A method for routing C-band and L-band optical signals, and a system, apparatus, and computer program that operate in accordance with the method. The method comprises selecting one or more C-band optical signals using one or more C-band components, resulting in one or more selected C-band optical signals. One or more L-band optical signals are selected using one or more L-band components, resulting in one or more selected L-band optical signals. The selected C-band and L-band optical signals are combined.

20 Claims, 8 Drawing Sheets

(56) References Cited

U.S. PATENT DOCUMENTS

| | | | |
|---|---|---|---|
| 2009/0142070 A1* | 6/2009 | Boduch et al. | 398/148 |
| 2009/0226168 A1* | 9/2009 | Boduch | 398/48 |
| 2009/0290873 A1* | 11/2009 | Takita et al. | 398/59 |
| 2010/0202778 A1* | 8/2010 | Wisseman | 398/83 |
| 2011/0013911 A1* | 1/2011 | Alexander et al. | 398/79 |
| 2011/0135305 A1* | 6/2011 | Barnard | 398/49 |
| 2011/0206204 A1* | 8/2011 | Sychev | 380/256 |
| 2011/0317255 A1* | 12/2011 | Shukunami et al. | 359/333 |
| 2012/0106984 A1* | 5/2012 | Jones et al. | 398/214 |
| 2012/0170928 A1* | 7/2012 | Tanaka et al. | 398/28 |
| 2012/0201539 A1* | 8/2012 | Boertjes et al. | 398/51 |
| 2012/0237153 A1* | 9/2012 | Weimann et al. | 385/1 |
| 2012/0321296 A1* | 12/2012 | Wellbrock et al. | 398/5 |
| 2012/0321306 A1* | 12/2012 | Wellbrock et al. | 398/48 |
| 2013/0302028 A1* | 11/2013 | Barnard | 398/25 |
| 2014/0003811 A1* | 1/2014 | Coroy | 398/50 |

OTHER PUBLICATIONS

Bo Zhang, Christian Malouin, Samuel Liu, and Theodore J. Schmidt "Penalty-Free Transmission of 127-Gb/s Coherent PM-QPSK over 1500-km of NDSF with 10 Cascaded 50-GHz ROADMs" OSA / OFC/NFOEC 2010.*

* cited by examiner

RECONFIGURABLE OPTICAL ADD/DROP MULTIPLEXER NETWORK ELEMENT FOR C-BAND AND L-BAND OPTICAL SIGNALS

BACKGROUND OF THE INVENTION

1. Field of the Invention

Example aspects described herein relate generally to optical communications systems employing dense wavelength division multiplexing (DWDM), and more particularly, to methods, apparatuses, systems, and computer programs that employ a reconfigurable optical add/drop multiplexer (ROADM) network element that is compatible with both C-band and L-band optical signals.

2. Description of the Related Art

Conventional dense wavelength division multiplexing (DWDM) optical networks achieve 10 gigabit per second (Gb/s) transmission in the C-band (i.e., the band of wavelengths from 1525 nanometers to 1560 nanometers) by using a modulation scheme called on-off keying (OOK). Nowadays, with increasing data usage, it would be desirable to achieve optical network bitrates higher than 10 Gb/s, such as, for example a bitrate of 100 Gb/s. However, achieving such higher bitrates using conventional networks is problematic due to certain optical limitations inherent to 10 Gb/s OOK C-band transmission. The bitrate of conventional C-band networks is limited by factors inherent to OOK, as well as by the inherent characteristic maximum bandwidth associated with erbium-doped fiber amplifiers (EDFAs), which are deployed in many C-band optical networks.

To achieve bitrates higher than 10 Gb/s (e.g., 100 Gb/s) while avoiding the above limitations, some networks have been developed that employ neither OOK modulation nor EDFAs. These networks employ a modulation scheme called polarization mode-quadrature phase shift keying (PM-QPSK) in the L-band wavelength band (i.e., the band of wavelengths ranging from 1565 nanometers to 1625 nanometers), without the use of EDFAs, and thereby avoid the above limitations of OOK and EDFAs.

There are several advantages to using a modulation scheme such as PM-QPSK. For example, the use of PM-QPSK enables optical signal transmission within the 50 GHz band at information rates of 100 Gb/s, better utilizing available bandwidth and enabling the use of less costly components (e.g., components designed to operate at frequencies less than 100 GHz). Also, PM-QPSK networks are much less sensitive to chromatic dispersion and polarization mode dispersion than other common modulation schemes (e.g., OOK).

However, there are unique challenges associated with using PM-QPSK in conventional C-band ROADM optical networks. For example, the optical signal quality (e.g., optical signal to noise ratio or OSNR) of PM-QPSK signals is degraded by dispersion compensating modules (DCMs), which are deployed in conventional C-band optical networks to correct for chromatic and/or polarization dispersion. Therefore, communicating 100 Gb/s signals in existing C-band ROADM networks through the use of PM-QPSK in the L-band is problematic because such C-band networks commonly include signal quality degrading DCMs.

One previous approach to solve this problem involved mixing 100 Gb/s networks in with current ROADM traffic. However, this approach requires additional costly regenerating transponders to compensate for the degradation of the L-band signals caused by the DCMs used in current networks. That is, at periodic points throughout the network, the regenerating transponders regenerate the L-band signals before the signals are degraded to a point of being unrecoverable. In most cases, regenerating transponders are implemented using two similar transmission cards at an ingress and an egress point of the network. Some large and/or long distance networks would require many regenerating transponders, which would make updating such networks with regenerating transponders quite costly.

Another previous approach to solving this problem involved installing additional ROADM modules along with additional WDM optical input/output ports (referred to as "ROADM degrees") at ROADM network elements to support 100 Gb/s traffic throughout the network. However, the number of ROADM degrees allowed at a single network element is limited (for example, by limitations inherent to one or more components (e.g., switches) of the network element), typically to four or eight degrees. If a service provider is using an eight-degree ROADM, it is not uncommon for five of those degrees to be occupied for existing C-band traffic, leaving only three available degrees with which to install 100 Gb/s links, which limits the flexibility in upgrading the network architecture.

Rather than developing a new large-scale optical network infrastructure for high-bitrate communication using PM-QPSK signals in the L-band, which could be quite costly, it would be desirable to integrate L-band PM-QPSK signals into existing C-band optical network infrastructure, to the extent possible.

However, without any device modifications, employing PM-QPSK signals in the L-band in existing C-band optical networks is problematic, because, as mentioned above, some techniques employed in optimizing signals in existing C-band networks (e.g., correcting certain characteristics of current OOK modulation and/or EDFAs) cause signal degradation of PM-QPSK signals in the L-band, as well as other problems.

Therefore, it would be useful to modify, in a cost-effective manner, conventional C-band optical networks to be compatible with both C-band and L-band optical signals.

SUMMARY

Existing limitations associated with the foregoing, as well as other limitations, can be overcome by a method for routing C-band and L-band optical signals, and by an apparatus, system, and computer program that operate in accordance with the method.

In one example embodiment herein, the method comprises selecting one or more C-band optical signals using one or more C-band components, resulting in one or more selected C-band optical signals. One or more L-band optical signals are selected using one or more L-band components, resulting in one or more selected L-band optical signals. The selected C-band and L-band optical signals are combined.

In one example embodiment, a wavelength division multiplexed optical signal is demultiplexed into the one or more C-band optical signals and the one or more L-band optical signals.

The one or more C-band optical signals are of a lower bitrate than the one or more L-band optical signals, according to another example.

In another example embodiment, the one or more C-band optical signals are encoded using on-off keying (OOK), and the one or more L-band optical signals are encoded using polarization mode quadrature phase shift keying (PM-QPSK).

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

It should be noted that different ones of the Figures may include the same reference numerals to identify the same components, and thus a description of each such component may not be provided herein with respect to each particular Figure.

DETAILED DESCRIPTION

Example aspects described herein relate generally to optical communications systems employing dense wavelength division multiplexing (DWDM), and more particularly, to methods, apparatuses, systems, and computer programs that employ a reconfigurable optical add/drop multiplexer (ROADM) network element that is compatible with both C-band and L-band optical signals.

Figure 1:
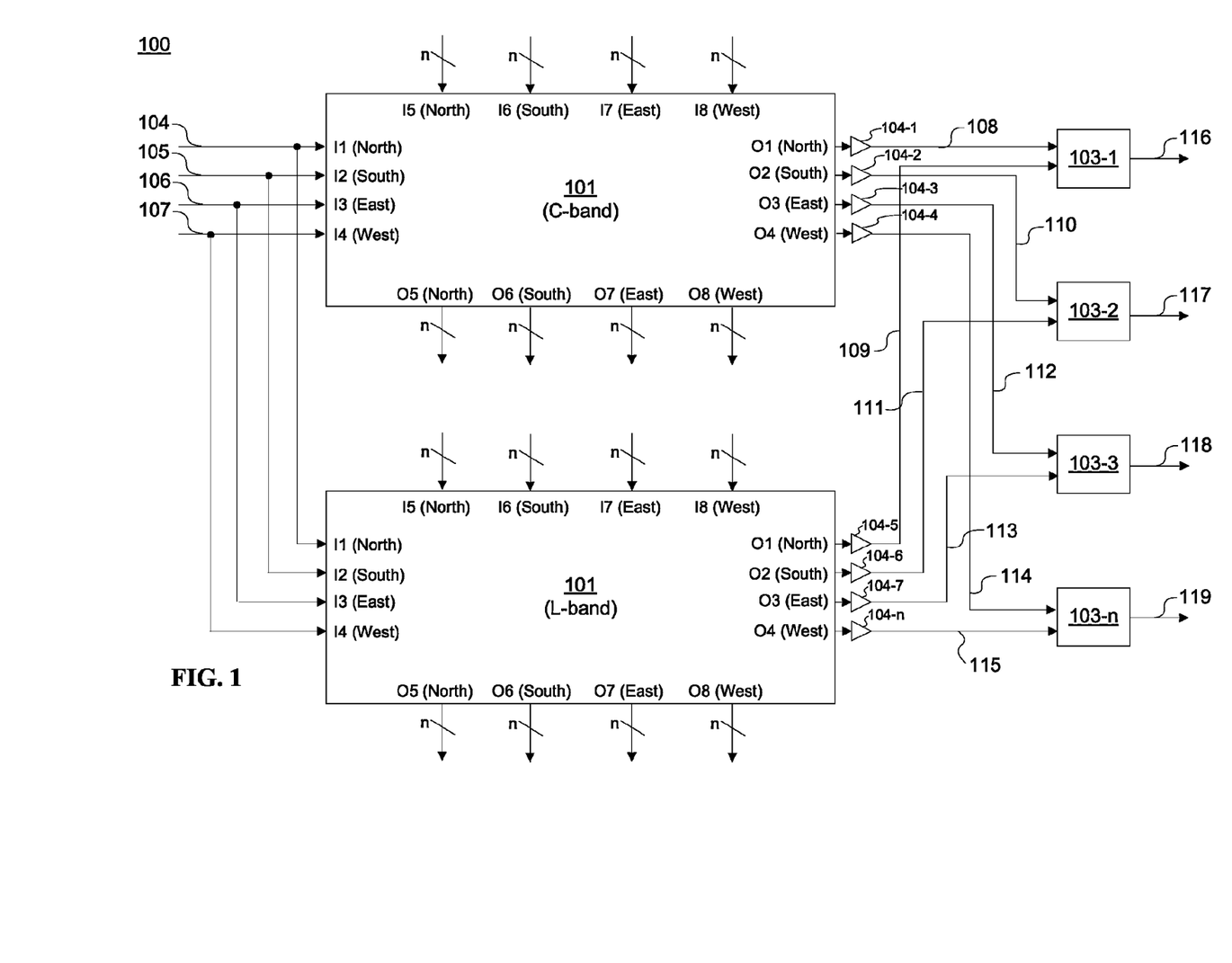
FIG. 1 shows an exemplary four degree ROADM optical network element that may be used to route C-band and L-band traffic in an optical network, in accordance with an example embodiment herein.

FIG. 1 shows an exemplary four degree ROADM optical network element 100 that may be used to route C-band and L-band traffic in an optical network, in accordance with an example embodiment herein. The network element 100 comprises a plurality of reconfigurable optical add/drop multiplexer (ROADM) subsystems, each identified by reference numeral 101 in FIG. 1. A first, upper one of the ROADMs subsystems 101 shown in FIG. 1 is designated as a "C-band" ROADM subsystem, and a second, lower one of the ROADM subsystems 101 shown in FIG. 1 is designated as an "L-band" ROADM subsystem. Each of the first and second ROADM subsystems 101 receives plural optical wavelength division multiplexed (WDM) signals at inputs I1 through I4 (designated "north", "south", "east", and "west", respectively) via optical paths 104 through 107, respectively. Each of the plural WDM signals received at inputs I1 through I4 includes plural C-band and L-band wavelengths (e.g., $\lambda 1$ through $\lambda n$) multiplexed thereon.

Although not shown in FIG. 1 for purposes of convenience, according to one example embodiment, the system 100 also includes one or more (e.g., 4) optical filters each having one optical input and two optical outputs. Each of the one or more optical filters can be interposed between a respective one of the one or more optical paths 104 through 107 and the first and second subsystems 101. Each of the optical filters operates by receiving, via one of the optical paths 104 through 107, an optical WDM signal including plural C-band and plural L-band wavelengths (e.g., $\lambda 1$ through $\lambda n$) multiplexed thereon; filtering the optical WDM signal into a C-band WDM signal including the plural C-band wavelengths and an L-band WDM signal including the plural L-band wavelengths; and providing, via a first output, the C-band WDM signal including the plural C-band wavelengths to one or more of the inputs I1 through I4 of the first (C-band) subsystem 101, and providing, via a second output, the L-band WDM signal including the plural L-band wavelengths to one or more of the inputs I1 through I4 of the second (L-band) subsystem 101.

In one example embodiment, each of the plural signals received at inputs I1-I4 includes 10 Gb/s C-band signals modulated using OOK and 100 Gb/s L-band signals modulated using PM-QPSK, although this example should not be construed as limiting. That is, each of the plural signals received at inputs I1-I4 can include signals of other bitrates, wavelength bands, and/or modulation schemes besides those referred to herein.

Each of the first and second ROADM subsystems 101 also receives plural local optical input signals at each of inputs I5 through I8 (designated "north", "south", "east", and "west", respectively) from one or more local sources, such as local optical networks, client terminals, and/or the like (not shown in FIG. 1), wherein each of inputs I5 through I8 can include n inputs, which receive signals of wavelengths $\lambda 1$ to $\lambda n$, respectively. Thus, according to one example embodiment, each of the inputs I5 through I8 receives n signals of wavelengths $\lambda 1$ through $\lambda n$, and each of the outputs O1 through O8 receives n signals of wavelengths $\lambda 1$ through $\lambda n$. The signals received at inputs I5 through I8 are sometimes referred to as local "add" signals because, as will be described below, they can be selectively added by the respective subsystem 101 for being outputted to one or more corresponding outputs O1 through O4 of the respective subsystem 101.

Although each of the ROADM subsystems 101 is shown in FIG. 1 as including inputs I1 through I4 for receiving optical WDM signals, inputs I5 through I8 for receiving local optical input signals, outputs O1 through O4 for outputting optical WDM signals, and outputs O5 through O8 for outputting local optical output signals, these particular numbers of inputs and outputs are for purposes of example only, and should not be construed as limiting to the scope of the invention.

In general, the first (C-band) ROADM subsystem 101 operates by selectively routing at least one of the plural C-band wavelengths (e.g., $\lambda 1$ through $\lambda n$) received at inputs I1-I8 to selected ones of the outputs O1-O8. Similarly, the second ROADM subsystem 101 operates by selectively routing at least one of the plural L-band wavelengths (e.g., $\lambda 1$ through $\lambda n$) received at inputs I1-I8 to selected ones of the outputs O1-O8. By example only, the first (C-band) ROADM subsystem 101 can select and route at least one C-band wavelength (e.g., $\lambda 1$) received at the north input (I1) to one (or more) of outputs O1, O2, O3, O4, O5, O6, O7, and O8 of that subsystem 101; and the second (L-band) ROADM subsystem 101 can select and route at least one L-band wavelength (e.g., λ2) received at the south input (I2) to one (or more) of outputs O1, O2, O3, O4, O5, O6, O7, and O8 of that subsystem 101, although those examples are not limiting.

Signals outputted from outputs O1 through O4 of the first and second ROADM subsystems 101 can be wavelength division multiplexed (WDM) output signals including plural wavelengths therein (e.g., each WDM signal including wavelengths λ1 to λn). In one example embodiment, each of the signals outputted via outputs O1-O4 of the first ROADM subsystem 101 is provided to a first modulator (e.g., an optical-electrical-optical (OEO) transponder) (not shown in FIG. 1) that modulates the signal into a 10 Gb/s C-band signal using OOK, and each of the signals outputted via outputs O1-O4 of the second ROADM subsystem 101 is provided to a second modulator (e.g., an OEO transponder) (not shown in FIG. 1) that modulates the signal into a 100 Gb/s L-band signal using PM-QPSK.

Each of the signals outputted via outputs O5 through O8 of each ROADM subsystem 101 can be demultiplexed, such that one or more wavelengths λ1 to λn are provided at each output. In one example embodiment herein, at least some of the signals provided at outputs O5-O8 are provided to one or more modulators (e.g., an OEO transponder) (not shown in FIG. 1) that modulate the at least some of the signals into C-band signals using OOK, and at least some other signals provided at outputs O5-O8 are provided to one or more modulators (e.g., an OEO transponder) (not shown in FIG. 1) that modulate the at least some of the signals into L-band signals using PM-QPSK. In one example embodiment, the one or more modulators are included in a transponder card, such as the transponder card designated HDTG 518 (high density ten gigabit) in FIGS. 5 and 6 (described below).

The signals provided at outputs O5 through O8 are forwarded to one or more predetermined destinations, such as, for example, one or more local optical networks, client terminals, and/or the like (not shown in FIG. 1). The signals provided at outputs O5 through O8 are sometimes referred to as "drop" signals because, as will be described below, they can be provided from (i.e., "dropped" from) one or more of the outputs O5 through O8 of the corresponding first or second ROADM subsystem 101, to predetermined destinations.

The network element 100 also can comprise one or more optical amplifiers, such as, in the illustrated example, optical amplifiers 104-1 through 104-$n$. The C-band signals outputted via outputs O1 through O4 of the first ROADM subsystem 101 are coupled to C-band amplifiers 104-1, 104-2, 104-3, and 104-4, respectively, and the L-band signals outputted via outputs O1 through O4 of the second ROADM subsystem 101 are coupled to L-band amplifiers 104-5, 104-6, 104-7, and 104-$n$, respectively. As will be described in further detail below in connection with FIGS. 3 and 4, each of the amplifiers 104-1 through 104-$n$ amplifies the signal received thereby from a respective one of the outputs O1 through O4 of the first or second ROADM subsystems 101.

The network element 100 also can comprise one or more combiners, such as, in the illustrated example, combiners 103-1, 103-2, 103-3, and 103-$n$. Each of the outputs of amplifiers 104-1 through 104-$n$ is provided to a corresponding input of one of combiners 103-1, 103-2, 103-3, and 103-$n$. For example, the C-band output of amplifier 104-1 and the L-band output of amplifier 104-5 are each provided to combiner 103-1 via optical paths 108 and 109, respectively; the C-band output of amplifier 104-2 and the L-band output of amplifier 104-6 are each provided to combiner 103-2 via optical paths 110 and 111, respectively; the C-band output of amplifier 104-3 and the L-band output of amplifier 104-7 are provided to combiner 103-3 via optical paths 112 and 113, respectively; and the C-band output of amplifier 104-4 and the L-band output of amplifier 104-$n$ are each provided to combiner 103-$n$ via optical paths 114 and 115, respectively.

Each of the combiners 103-1, 103-2, 103-3, and 103-$n$ operates by combining, through (in one example) wavelength division multiplexing, the signals received thereby from corresponding ones of the amplifiers 104-1 through 104-$n$. For example, the 103-1 combiner combines the C-band signal received from the output of amplifier 104-1 and the L-band signal received from output of amplifier 104-5; the combiner 103-2 combines the C-band signal received from the output of amplifier 104-2 and the L-band signal received from the output of amplifier 104-6; the combiner 103-3 combines the C-band signal received from output of amplifier 104-3 and the L-band signal received from output of amplifier 104-7; and the combiner 103-$n$ combines the C-band signal received from output of amplifier 104-4 and the L-band signal received from output of amplifier 104-$n$. Each of the combined C-band/L-band WDM signals are then provided to predetermined destinations (e.g., another ROADM network element) by the combiners 103-1, 103-2, 103-3, and 103-$n$ via WDM optical paths 116, 117, 118, and 119, respectively.

Figure 2:
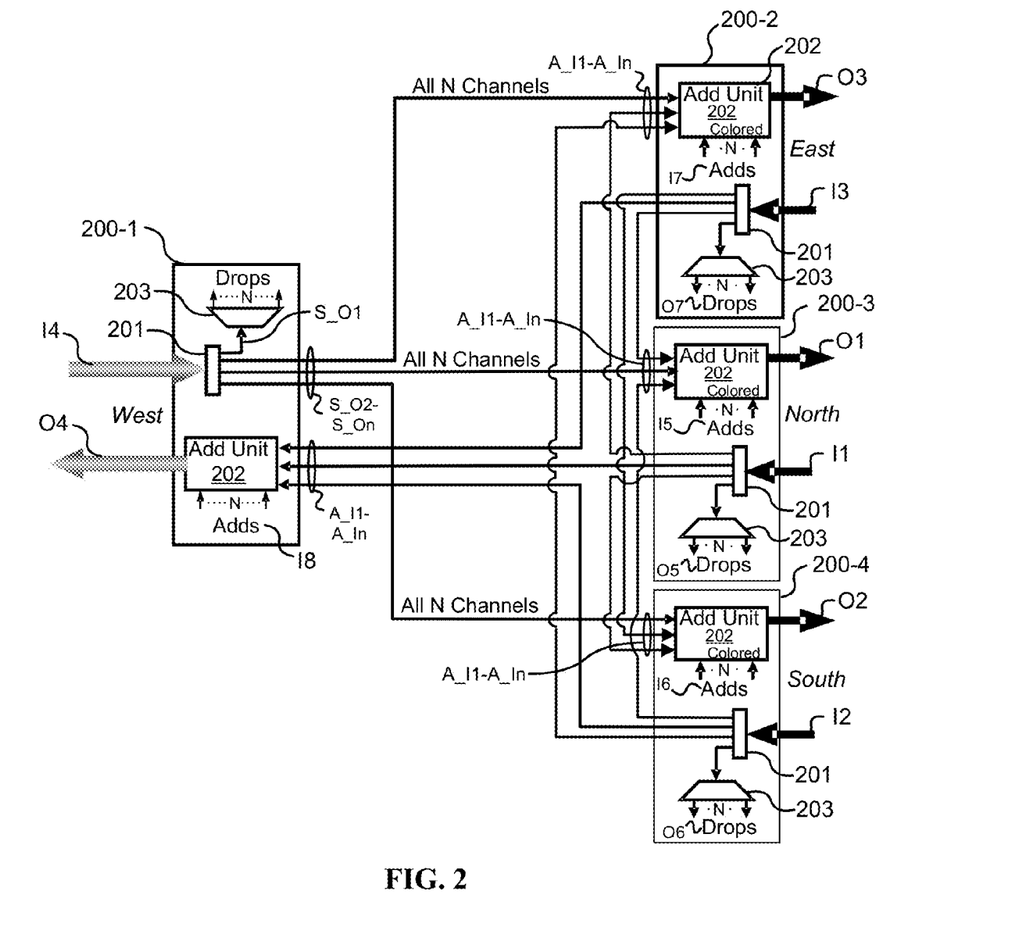
FIG. 2 shows an example architecture of a ROADM subsystem, which, in the illustrated embodiment, is a four degree ROADM subsystem, in accordance with an example embodiment herein.

FIG. 2 shows an example architecture of a ROADM subsystem, such as ROADM subsystem 101, in more detail (i.e., the configuration of FIG. 2 can form one or each of the subsystems 101 of FIG. 1). In the embodiment shown in FIG. 2, the ROADM subsystem 101 is a four degree ROADM subsystem. It should be understood that when the following description refers to particular signals or components, those signals or components will be C-band signals or components for the case of a C-band subsystem (e.g., the upper subsystem 101 of FIG. 1), and those signals or components will be L-band signals or components for the case of a L-band subsystem (e.g., the lower subsystem 101 of FIG. 1).

The ROADM subsystem 101 of FIG. 2 comprises a first ROADM module (or degree) (designated as "West" 200-1), a second ROADM module (designated as "East" 200-2), a third ROADM module (designated as "North" 200-3), and a fourth ROADM module (designated as "South" 200-4). Each ROADM module comprises a coupling device 201 such as an optical splitter, an add unit 202, and a drop unit 203 (e.g., a demultiplexer). For the first ROADM module 200-1, optical signals inputted into the coupling device 201 via input I4 are provided on each of plural outputs S_O1, S_O2, S_O3, and S_On of the device 201 (e.g., the signals are split by a splitter and outputted to the outputs S_O1, S_O2, S_O3, and S_On), and, in one example embodiment, n wavelengths (e.g., n=88) received at input I4 are provided on each output S_O1, S_O2, S_O3, and S_On.

The signals provided at output S_O1 are forwarded to the drop unit 203 of the first ROADM module 200-1, which demultiplexes the signals into a plurality of individual constituent wavelengths and outputs them to a predetermined destination, such as, for example, a local network, client terminals, or the like. Also, the signals provided on outputs S_O2, S_O3, and S_On are provided to an input of an add unit 202 of respective ones of the second, third, and fourth ROADM modules 200-2, 200-3, and 200-4. Although the outputs S_O2, S_O3, and S_On are represented for purposes of convenience as being singular and being coupled to the devices 202 via respective singular communication paths, in one example embodiment each output and path may be plural (e.g., each output S_O2, S_O3, and S_On can includes n outputs coupled to the devices 202 by way of n communication paths).

At each of the second, third, and fourth ROADM modules 200-2, 200-3, and 200-4, respectively, add unit 202 operates by selecting at least one wavelength from among the wavelengths received at inputs A_I1-A_In and add ports (e.g., local add ports, designated I7, I5, and I6 for the second, third, and fourth ROADM modules 200-2, 200-3, and 200-4, respectively). For example, in one embodiment the add unit 202 of the second ROADM module 200-2 selects, for each of the n wavelengths, one wavelength from among those received from the first ROADM module 200-1, the third ROADM module 200-3, the fourth ROADM module 200-4, and the local add port I7. In one example, the local add port I7 (which can include n ports) receives plural signals (e.g., n signals), each of the plural signals including a particular one of plural wavelengths (e.g., one of wavelengths λ1 through λn). By example only, the add unit 202 of the second ROADM module 200-2 may select wavelength (λ1) received from the third ROADM module 200-3, while not selecting wavelength (λ1) from the first ROADM module 200-1, the fourth ROADM module 200-4, and the local add port I7, and may select wavelength (λ2) from the fourth ROADM module 200-4, while not selecting wavelength (λ2) from the first ROADM module 200-1, the third ROADM module 200-3, and the local add port I7, etc. Also by example only, the add unit 202 of the third ROADM module 200-3 may select wavelength (λ1) received from the second ROADM module 200-2, while not selecting wavelength (λ1) from the first ROADM module 200-1, the fourth ROADM module 200-4, and the local add port I5, and may select wavelength (λ2) from the fourth ROADM module 200-4, while not selecting wavelength (λ2) from the first ROADM module 200-1, the second ROADM module 200-2 and the local add port I5. Further by example only, the add unit 202 of the fourth ROADM module 200-4 may select wavelength (λ1) received from the third ROADM module 200-3, while not selecting wavelength (λ1) from the first ROADM module 200-1, the second ROADM module 200-2, and the local add port I6, and may select wavelength (λ2) from the first ROADM module 200-1, while not selecting wavelength (λ2) from the second ROADM module 200-2, the third ROADM module 200-3, and the local add port I6. Still further by example, the add unit 202 of the first ROADM module 200-1 may select wavelength (λ1) received from the second ROADM module 200-2, while not selecting wavelength (λ1) from the third ROADM module 200-3, the fourth ROADM module 200-4, and the local add port I8, and may select wavelength (λ2) from the third ROADM module 200-3, while not selecting wavelength (λ2) from the second ROADM module 200-2, the fourth ROADM module 200-4, and the local add port I8. Of course, the above examples are for purposes of illustration only, and the wavelengths selected by each particular add unit may be different from those described above.

The wavelengths selected by each of the add units 202 of the first, second, third, and fourth ROADM modules 200-1, 200-2, 200-3, and 200-4, respectively, are then outputted by those respective modules. As will be described further below, in one example embodiment, the wavelengths selected by the add units 202 of those respective individual modules 200-1 to 200-4 can be wavelength division multiplexed prior to being outputted (e.g., via outputs O1 through O4, respectively) (although for convenience, no multiplexers are shown in those modules in FIG. 2; multiplexers are described below in the context of FIGS. 3 and 4).

Referring again to the first ROADM module 200-1, the add unit 202 thereof has inputs A_I1-A_In that are coupled to outputs S_O1-S_On of a coupling device 201 of each of the second, third, and fourth ROADM modules 200-2, 200-3, and 200-4, respectively. The add unit 202 of the first ROADM module 200-1 operates in a similar manner as the add unit 202 of each other device 200-2, 200-3, and 200-4 by selecting at least one wavelength received at inputs A_I1-A_In and add port I8 (e.g., local add port). For example, as described above, in one embodiment the add unit 202 of the first ROADM module 200-1 selects, for each of the n wavelengths, one wavelength from among those received from the second ROADM module 200-2, the third ROADM module 200-3, the fourth ROADM module 200-4, and the local add port I8. By example only, the add unit 202 of the first ROADM module 200-1 may select wavelength (λ1) received from the third ROADM module 200-3, while not selecting wavelength (λ1) from the second ROADM module 200-2, the fourth ROADM module 200-4, and the local add port I8, and may select wavelength (λ2) from the fourth ROADM module 200-4, while not selecting wavelength (λ2) from the second ROADM module 200-2, the third ROADM module 200-3, and the local add port I8, etc. As described above, although not shown in FIG. 2 for convenience, outputs O1 through O4 of each of the first, second, third, and fourth ROADM modules 200-1, 200-2, 200-3, and 200-4 also can be coupled to one or more respective amplifiers (e.g., one or more of amplifiers 104-1 through 104-n of FIG. 1) for amplifying signals provided on the respective outputs.

Moreover, the coupling devices 201 and demultiplexers 203 of the second, third, and fourth devices 200-2, 200-3, and 200-4 each operate in a similar manner as those described above for the first ROADM module 200-1.

Figure 3:
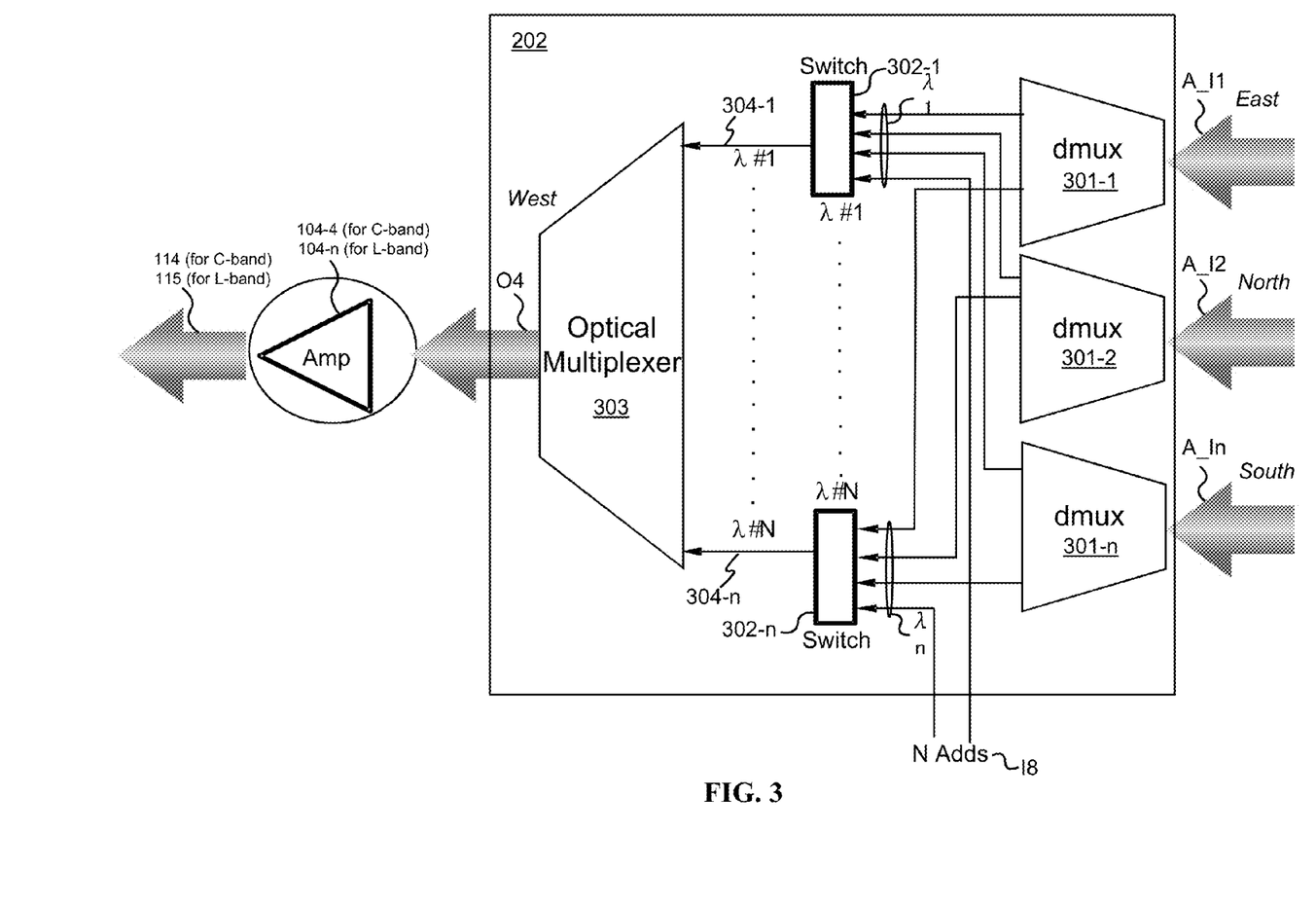
FIG. 3 illustrates a more detailed example of an add unit of a ROADM module and an optical amplifier, in accordance with an example embodiment herein.

Referring now to FIG. 3, a more detailed example of an add unit of a ROADM module and an optical amplifier will now be described. The add unit 202 of FIG. 3 can be included in one or more of the add units 202 of FIG. 2, and the amplifier of FIG. 3 can be included in one or more of the amplifiers 104-1 through 104-n of FIG. 1, in one example. However, for purposes of convenience the following description of an add unit and an amplifier is made in the context of an add unit of the first ROADM module 200-1 (i.e., the west ROADM module) and a corresponding amplifier (i.e., amplifier 104-4 for C-band and amplifier 104-n for L-band). Additionally, the following description of the add unit and amplifier applies similarly to an add unit and amplifier of the C-band ROADM subsystem 101 of FIG. 1 and an add unit and amplifier of the L-band ROADM subsystem 101 of FIG. 1. It should be understood that for the following description, signals or components are C-band signals and components for an add unit in the context of the C-band ROADM subsystem 101 of FIG. 1, and L-band signals and components for an add unit in the context of the L-band ROADM subsystem 101 of FIG. 1.

As shown in FIG. 3, the add unit 202 comprises plural demultiplexers, such as demultiplexers 301-1, 301-2, and 301-n. The demultiplexers 301-1, 301-2, and 301-n receive WDM signals on inputs A_I1-A_I2, A_In, respectively, from the second, third, and fourth degree devices 200-2, 200-3, and 200-4 (FIG. 2), respectively. In one example, the inputs A_I1, A_I2, A_In of FIG. 3 correspond to the inputs A_I1, A_I2, A_In of FIG. 2. Each of the demultiplexers 301-1, 301-2, and 301-n operates by demultiplexing each multiplexed signal received from a respective one of the inputs A_I1, A_I2, A_In into a plurality of individual constituent wavelengths (e.g., λ1 through λn for each signal received at inputs A_I1, A_I2, A_In) and outputting the resulting demultiplexed wavelengths to plural wavelength selective switches 302-1 through 302-n, respectively. For example, the demultiplexer 301-1 demultiplexes a signal that it received at input A_I1 into n signals having respective wavelengths λ1 through λn, and provides the n signals to the switches 302-1 through 302-n, respectively, such that each switch receives a separate wavelength; the demultiplexer 301-2 demultiplexes a signal that it receives at input A_I2 into n signals having respective wavelengths λ1 through λn, and provides the n signals to the switches 302-1 through 302-n, respectively, such that each switch receives a separate wavelength; and the demultiplexer 301-3 demultiplexes a signal that it receives at input A_I3 into n signals having respective wavelengths λ1 through λn, and provides the n signals to the switches 302-1 through 302-n, respectively, such that each switch receives a separate wavelength.

In addition to the demultiplexed signals received from the demultiplexers 301-1, 301-2, and 301-n, the switches 302-1 through 302-n also receive n local add inputs I8 of wavelengths λ1 through λn, respectively. That is, switch 302-1 receives a local add input I8 of wavelength λ1, switch 302-2 receives a local add input I8 of wavelength λ2, switch 302-n receives a local add input I8 of wavelength λn, etc.

Each of the switches 302-1 through 302-n receives a same respective wavelength from each of the demultiplexers 301-1, 301-2, 301-n, and the local add input I8. For example, switch 302-1 receives a wavelength (λ1) from each of demultiplexers 301-1, 301-2, and 301-n, as well as a wavelength (λ1) from the local add input I8; switch 302-2 receives a wavelength (λ2) from each of demultiplexers 301-1, 301-2, and 301-n, as well as a wavelength (λ2) from the local add input I8, etc. Each of the switches 302-1 through 302-n operates by selecting and forwarding one wavelength from among the plural wavelengths received from each of the demultiplexers 301-1, 301-2, 301-n, and from the local add input I8. For example, switch 302-1 selects and forwards one wavelength from among the wavelengths (λ1) received from demultiplexers 301-1, 301-2, and 301-n, and the local add input I8; switch 302-2 selects and forwards one wavelength from among the wavelengths (λ2) received from demultiplexers 301-1, 301-2, and 301-n, and the local add input I8, and switch 302-n selects and forwards one wavelength from among the wavelengths (λn) received from demultiplexers 301-1, 301-2, and 301-n, and the local add input I8. The switches 302-1 through 302-n then provide the selected wavelength signals to an optical multiplexer 303 via n respective optical paths 304-1 through 304-n, respectively.

Optical multiplexer 303 operates by wavelength division multiplexing all of the signals received from the n switches 302-1 through 302-n onto at least one WDM optical path (which, in one example embodiment corresponds to output O4 of FIGS. 1 and 2), and providing the resulting WDM signal to the output designated 114 (for C-band)/115 (for L-band) by way of an amplifier designated 104-4 (for C-band)/104-n (for L-band).

Figures 4, 4A, 4B:
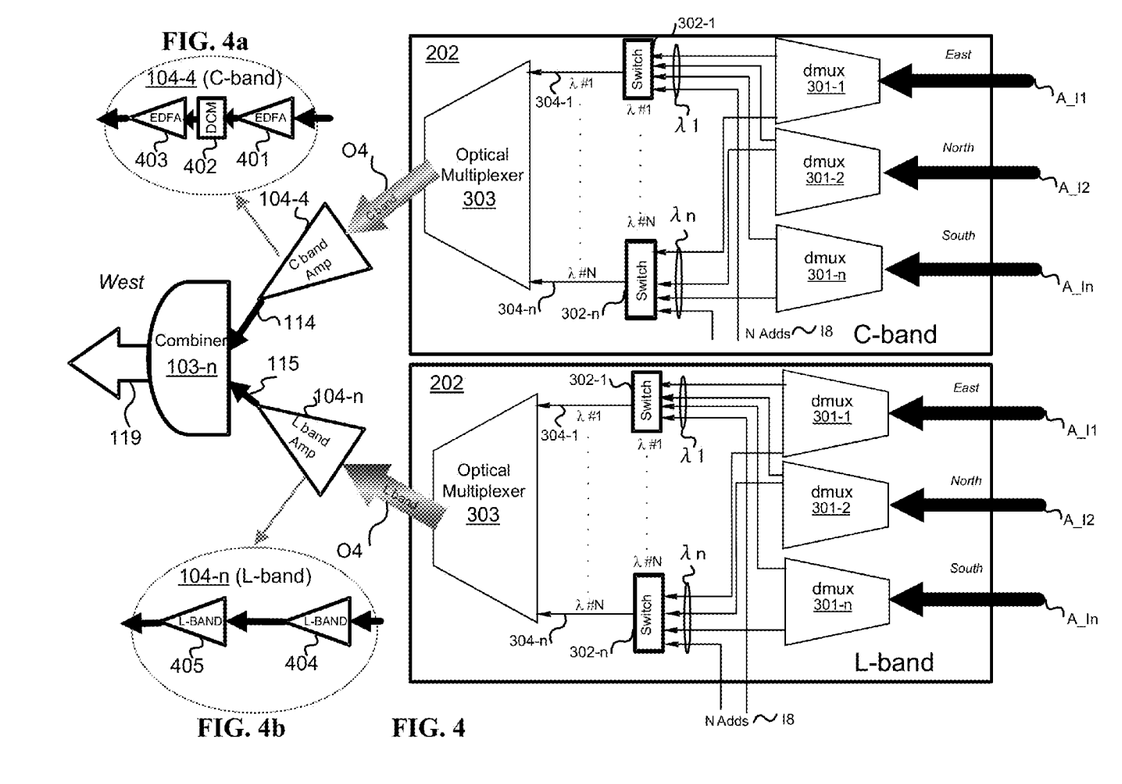
FIG. 4 illustrates a more detailed representation of example C-band and L-band add units of a ROADM module and C-band and L-band amplifiers, in accordance with an example embodiment herein.
FIG. 4a illustrates one example embodiment of a C-band amplifier of a ROADM module.
FIG. 4b illustrates one example embodiment of an L-band amplifier of a ROADM module.

Referring now to FIG. 4, a representation of example C-band and L-band add units of a ROADM module and C-band and L-band amplifiers will now be described. Illustrated in FIG. 4 are a C-band add unit 202 and an L-band add unit 202. The add units 202 of FIG. 4 can be the same as one or more of the add units 202 of FIGS. 2 and 3, and thus share the same reference numerals. Thus, the components (301-1 through 301-n, 302-1 through 302-n, and 303) of the C-band add unit 202 and the devices (301-1 through 301-n, 302-1 through 302-n, and 303) of the L-band add unit 202 of FIG. 4 each operate in a similar manner as described above in connection with the corresponding components (301-1 through 301-n, 302-1 through 302-n, and 303) of the add unit 202 of FIGS. 2 and 3, and therefore another detailed description thereof will not be provided. Moreover, for purposes of this description, FIG. 4 represents component 103-n of a "West" degree of the four degree ROADM optical network element 100 shown in FIG. 1; however it should be understood in view of this description that a similar configuration also would be applicable for "East", "North", and "South" degrees of the four degree ROADM optical network element 100 shown in FIG. 1 as well.

Each of the C-band add unit 202 and the L-band add unit 202 receives WDM signals at inputs A_I1, A_I2, and A_In, each of which signals includes plural wavelengths in the applicable band. According to one example embodiment, the WDM inputs A_I1, A_I2, and A_In of FIG. 4 correspond to the WDM inputs A_I1, A_I2, and A_In of FIGS. 2 and 3. In a manner similar to that described above in connection with the add unit 202 of FIGS. 2 and 3, the C-band add unit 202 of FIG. 4 selects one or more C-band wavelengths received from inputs A_I1, A_I2, A_In, and from local add input I8, and wavelength division multiplexes the selected C-band wavelengths onto at least one C-band WDM optical path O4. Likewise, in a manner similar to that described above in connection with the add unit 202 of FIGS. 2 and 3, the L-band add unit 202 of FIG. 4 selects one or more L-band wavelengths received from inputs A_I1, A_I2, A_In, and from local add input I8, and wavelength division multiplexes the selected L-band wavelengths onto at least one common L-band WDM optical path O4. The C-band add unit 202 provides the C-band WDM signal to a C-band amplifier 104-4 via the C-band WDM optical path O4, and the L-band add unit 202 provides the L-band WDM signal to an L-band amplifier 104-n via L-band WDM optical path O4.

Referring also to FIG. 4a, one example embodiment of C-band amplifier 104-4 is shown in detail. The amplifier 104-4 is comprised of a dispersion compensating unit (DCM) 402 interposed between an output of a preamplifying erbium doped fiber amplifier (EDFA) 401 and an input of a long reach EDFA 403. The preamplifying EDFA 401 receives the C-band WDM signal via the optical path O4, amplifies all of the plural wavelengths of the C-band WDM signal to a predetermined power level (e.g., a power level suitable for enabling the signal to be received by the DCM 402), and provides the preamplified C-band WDM signal to the DCM 402, which provides compensation for chromatic dispersion. The DCM 402 includes a length of fiber (not shown in FIG. 4) patterned to have reverse characteristics of dispersion. As the preamplified signal travels the length of fiber in the DCM 402, signals at wavelengths that may have been positively dispersed are negatively dispersed, and signals at wavelengths that may have been negatively dispersed are positively dispersed, resulting in a dispersion compensated C-band WDM signal (i.e., to minimize temporal offset between the signals). The DCM 402 then provides the dispersion compensated C-band WDM signal to the long reach EDFA 403.

The long reach EDFA 403 amplifies the power of the dispersion compensated C-band WDM signal to a predetermined level (e.g., a level suitable for enabling the signal to be transmitted over relatively long distances (e.g., hundreds of miles)), and provides the amplified C-band WDM signal to at least one combiner 103-n (described below) via optical communication path 114. The combiner 103-n of FIG. 4 can correspond to any one of the combiners 103-1 to 103-n of FIG. 1, but for purposes of the present example, it is deemed to correspond to combiner 103-n because FIG. 4 represents a combiner for the "West" ROADM degree only, as mentioned above.

Referring also to FIG. 4b, rather than including EDFAs and DCMs, which, as described above, can cause degradation of L-band signal quality, the L-band amplifier 104-n includes an L-band preamplifier 404 and an L-band long reach amplifier 405. The L-band preamplifier 404 receives the L-band WDM signal from the optical path O4, and amplifies all of the plural wavelengths of the L-band WDM signal to a predetermined power level (e.g., a power level suitable for enabling the signal to be received by the L-band long reach amplifier 405). The L-band preamplifier 404 then provides the preamplified L-band signal to the L-band long reach amplifier 405.

The L-band long reach amplifier 405 amplifies the power of the preamplified L-band WDM signal to a predetermined power level (e.g., a power level suitable for enabling the signal to be transmitted over relatively long distances, such as hundreds of miles), and provides the amplified L-band WDM signal to the combiner 103-$n$ via optical communication path 115.

The combiner 103-$n$ operates by wavelength division multiplexing the C-band WDM signal received from the long reach EDFA 403 and the L-band WDM signal received from the L-band long reach amplifier 405 onto at least one communication path 119, through which the combined WDM signal (including C-band and L-band wavelengths) is provided to a predetermined destination, such as another ROADM network element (e.g., located in another geographical area), another network component, or otherwise.

As can be appreciated in view of the description herein, by using separate signal paths, components, and/or subsystems (e.g., the first (C-band) ROADM subsystem 101 and the second (L-band) ROADM subsystem 101 described above in the context of FIG. 1) to route C-band traffic and L-band traffic, different signal optimization (e.g., chromatic dispersion compensation, signal amplification, etc.) can be employed for each band of traffic. For example, since the PM-QPSK modulation scheme, which can be used for 100 Gb/s transmission, can be adversely affected by the use of DCMs, 100 Gb/s PM-QPSK signals can be routed using a ROADM subsystem (e.g., the second (L-band) subsystem 101) that does not include DCMs. Similarly, OOK-based traffic (e.g., signals transmitted at information rates less than 100 Gb/s), which benefits from the use of DCMs, can be routed using a ROADM subsystem (e.g., the first (C-band) subsystem 101) that includes one or more DCMs to provide dispersion compensation. Thus, optical signals can be separately optimized for multiple modulation schemes.

As will be described below in connection with FIGS. 5 and 6, the various devices described herein (e.g., the devices illustrated in FIG. 4) can take the form of one or more optical cards installed in one of multiple slots of a rack assembly. According to one example embodiment, the combiner 103-$n$ and the L-band amplifier 104-$n$ of FIG. 4 can be included on a first optical card, the C-band amplifier 104-4 of FIG. 4 can be included on a second optical card, the C-band add unit 202 can be included on a third optical circuit card, and the L-band add unit 202 can be included on a fourth optical card. However, this optical card configuration is provided by example only, and should not be construed as limiting to the scope of the invention.

The above example embodiments enable an optical network to be provided that simultaneously supports the communication of both C-band and L-band signals via at least one communication path, despite the incompatibility of certain C-band and L-band optical network components (e.g., EDFAs, DCMS, etc.). An existing C-band optical network can be modified in a cost effective manner to support the communication of high bitrate L-band signals, without requiring the installation of new optical fiber communication paths and/or regenerating transponders.

Figure 5:
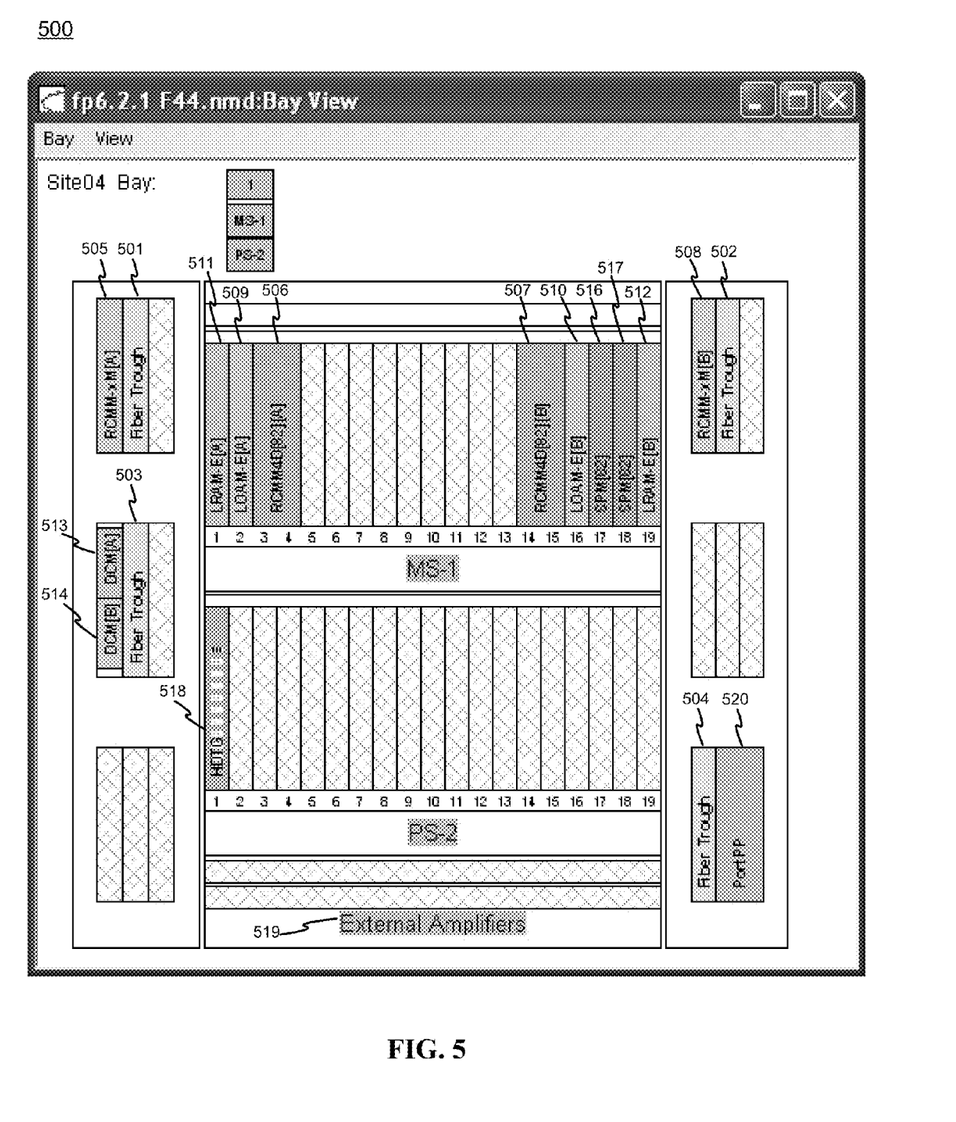
FIG. 5 illustrates an example rack assembly housing components of a C-band network element, in accordance with an example embodiment herein.

Referring now to FIG. 5, an example rack assembly 500 housing components of a C-band network element (such as a network element comprising the C-band ROADM subsystem 101 described above in connection with FIG. 1) will now be described. The particular arrangement of the components of the rack assembly 500 described below is provided by way of example only, and should not be construed being limiting to the scope of the invention.

As can be appreciated in view of FIG. 5, the rack assembly 500 includes multiple slots in which various optical cards can be installed. Although not shown in FIG. 5 for purposes of convenience, the rack assembly 500 can include various interconnections (e.g., a backplane, optical fibers, optical ribbon cables, connectors, and/or the like) via which signals can be provided between the various installed cards. In one example embodiment, one or more optical communication lines are routed between two or more of various installed optical cards via one or more of fiber troughs 501, 502, 503, and 504.

Also installed in the rack assembly 500 are C-band reconfigurable optical add/drop multiplexer modules (designated RCMMs 505, 506, 507, and 508), which, according to one example embodiment, correspond to a respective one of first, second, third, and fourth ROADM modules 200-1, 200-2, 200-3, and 200-4 described above in connection with FIG. 2.

Also installed in the rack assembly 500 are C-band preamplifying optical line amplifiers 509 and 510, and C-band long reach optical amplifiers 511 and 512, which, according to one example embodiment, correspond to the preamplifying and long reach EDFAs 401 and 403, respectively, described above (FIG. 4).

C-band DCMs 513 and 514 installed in the rack assembly 500, according to one example embodiment, represent multiple instances of the DCM 402 described above in connection with FIG. 4. For example, the DCM 402 of the first and second ROADM modules 200-1 and 200-2 of FIG. 2 are represented by the DCM 513 and the DCM 402 of the third and fourth ROADM modules 200-3 and 200-4 of FIG. 2 are represented by the DCM 514.

The rack assembly 500 also includes system processing modules designated SPM 516 and 517 that can control the switches and other components of the various embodiments herein.

The rack assembly 500 also includes one or more transponder cards, such as the high density ten gigabit transponder card designated HDTG 518, that includes lasers for transmitting optical signals and receivers for receiving optical signals transmitted from other locations. In one example embodiment, as described above in connection with FIG. 1, the HDTG 518 transponder card can include one or more modulators (e.g., one or more OEO transponders) for modulating one or more signals.

The rack assembly 500 also includes one or more external amplifiers 519 (e.g., RAMAN amplifiers) for amplifying optical signals to a predetermined power level suitable for being transmitted and received across very long distances.

A port 520 is provided in the rack assembly 500 to provide one or more connectors through which one or more C-band external optical input and/or output lines (e.g., optical inputs I1 through I8 of FIG. 1) can connect to one or more of the installed optical cards 505 through 519 via a port 520. According to one example embodiment, the components installed in the rack assembly 500 are interconnected and collectively function as the C-band network element 101 described above in connection with FIG. 1.

Figure 6:
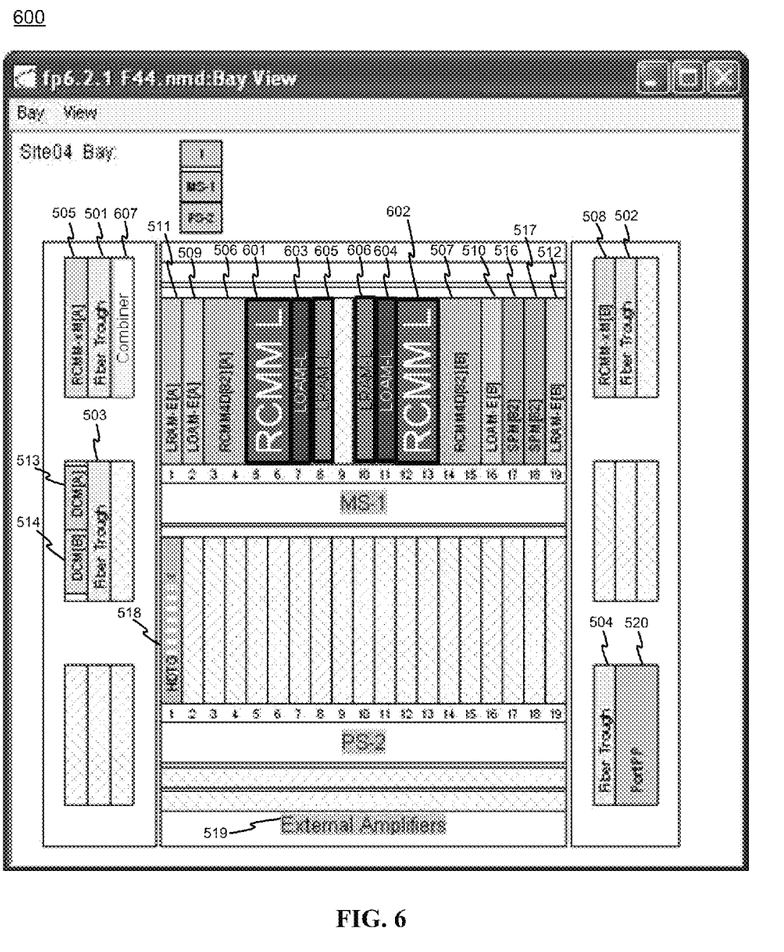
FIG. 6 illustrates an example rack assembly housing components of a C-band/L-band network element, in accordance with an example embodiment herein.

Referring now to FIG. 6, an example rack assembly 600 housing components of a C-band/L-band network element (such as the network element 100 described above in connection with FIG. 1, comprising a C-band ROADM subsystem 101 and an L-band ROADM subsystem 101). The particular arrangement of the components of the rack assembly 600 described below is provided by example only, and should not be construed as limiting to the scope of the invention.

As in the rack assembly 500 of FIG. 5, the rack assembly 600 of FIG. 6 includes multiple slots in which various optical cards can be installed. Although not shown in FIG. 6 for purposes of convenience, the rack assembly 600 also includes various interconnections (e.g., a backplane, optical fibers, optical ribbon cables, and/or the like) via which installed cards can communicate. In one example embodiment, one or more optical communication lines are routed between two or more of the various installed optical cards via one or more of fiber troughs 501, 502, 503, and 504.

As depicted in FIG. 6, the rack assembly 600 includes components 501 through 520, which are the same as components 501 through 520 described above in connection with the rack assembly 500 of FIG. 5. In addition, in order to enable the C-band rack assembly 600 to accommodate L-band signals, the rack assembly 600 also includes additional components 601 through 607 (described below).

The additional L-band components installed in the rack assembly 600 include L-band reconfigurable optical add/drop multiplexer modules (designated RCMMs 601 and 602). According to one example embodiment, RCMM 601 corresponds to the first and second (L-band) ROADM modules 200-1 and 200-2 of the L-band ROADM subsystem 101, and the RCMM 602 corresponds to the third and fourth (L-band) ROADM modules 200-3 and 200-4 of the L-band ROADM subsystem 101, each described above in connection with FIG. 2.

Also installed in the rack assembly 600 are L-band preamplifying optical line amplifiers 603 and 604, and L-band long reach optical amplifiers 605 and 606. According to one example embodiment, the L-band preamplifying optical line amplifier 603 corresponds to the L-band preamplifying amplifiers 404 (FIG. 4) of the first and second (L-band) ROADM modules 200-1 and 200-2 of FIG. 2, and the L-band preamplifying optical line amplifier 604 corresponds to the L-band preamplifying amplifiers 404 (FIG. 4) of the third and fourth (L-band) ROADM modules 200-3 and 200-4 of FIG. 2. Similarly, the L-band long reach optical amplifier 605 corresponds to the L-band long reach optical amplifiers 405 (FIG. 4) of the first and second (L-band) ROADM modules 200-1 and 200-2 of FIG. 2, and the L-band long reach optical amplifier 605 corresponds to the L-band long reach optical amplifiers 405 (FIG. 4) of the third and fourth (L-band) ROADM modules 200-3 and 200-4 of FIG. 2.

The rack assembly 600 also includes a combiner module 607, which, according to one example embodiment, represents at least one of the combiners 103-1, 103-2, 103-3, and 103-n described above in connection with FIGS. 1 and/or 4.

A port 520 is provided in the rack assembly 600 to provide one or more connectors through which one or more external C-band and/or L-band optical input and/or output lines (e.g., optical inputs I1 through I8 of FIG. 1) can connect to one or more of the installed optical cards 501 through 519 and 601 through 607. According to one example embodiment, the components 501 through 519 and 601 through 607 installed in the rack assembly 600 are interconnected and collectively function as the network element 100 of FIG. 1.

Figure 7:
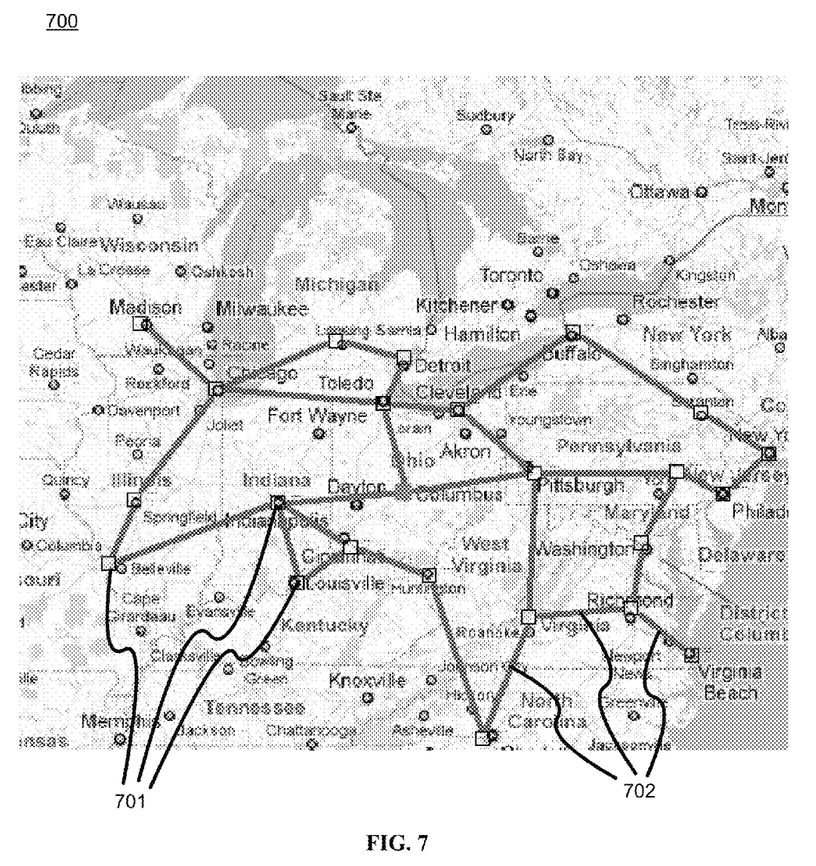
FIG. 7 illustrates an exemplary topology of a C-band ROADM optical network overlaid upon a map of the northeastern United States, in accordance with an example embodiment herein.

Referring now to FIG. 7, an exemplary topology 700 of a C-band ROADM optical network overlaid upon a map of the northeastern United States will now be described. As shown in FIG. 7, the topology 700 includes multiple C-band nodes 701 installed in various cities, each node of which represents a C-band ROADM network element, such as the C-band network element embodied in the rack assembly 500 of FIG. 5. Each of the nodes 701 is interconnected to one or more of the other nodes 701 via long distance optical communication lines 702. Each of the nodes 701 route C-band optical traffic throughout the network 700 via the long distance WDM optical lines 702.

Figure 8:
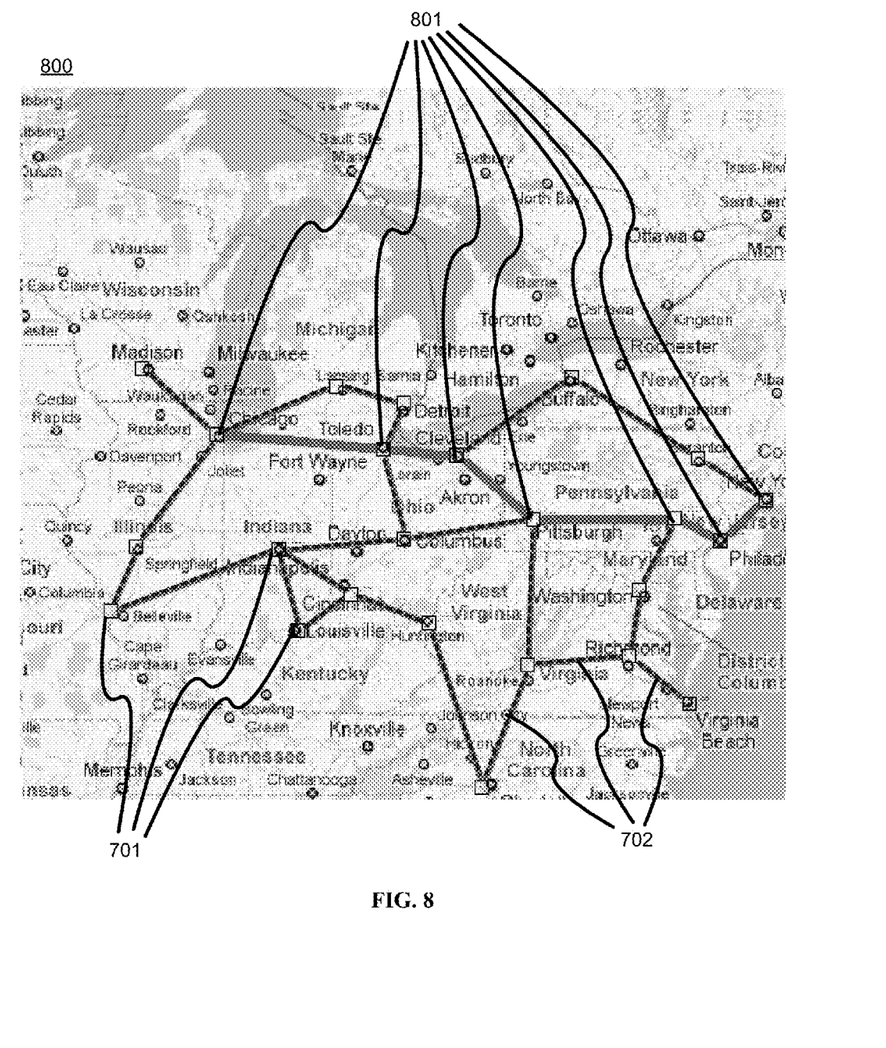
FIG. 8 illustrates an exemplary topology of a C-band/L-band optical network overlaid upon a map of the northeastern United States, in accordance with an example embodiment herein.

Referring now to FIG. 8, an exemplary topology 800 of a C-band/L-band optical network overlaid upon a map of the northeastern United States will now be described. As in the topology 700 of FIG. 7, the topology 800 of FIG. 8 includes multiple C-band nodes 701 installed in various cities, each node of which represents a C-band ROADM network element, such as the C-band network element embodied in the rack assembly 500 of FIG. 5.

In addition, the topology 800 includes C-band/L-band nodes 801 installed in certain cities (from Chicago to New York in, the illustrated example), each node of which each represents a C-band/L-band network ROADM element that supports both C-band and L-band traffic, such as the C-band/L-band ROADM network element embodied in the rack assembly 600 of FIG. 6.

Each of the nodes 701 and 801 is interconnected to one or more of the other nodes 701 and 801 via long distance optical lines 702. While the C-band nodes 701 can only accommodate C-band optical traffic, the C-band and L-band nodes 801 can accommodate both C-band and L-band optical traffic via the long distance WDM optical lines 702.

As can be appreciated in view of the foregoing description, despite the incompatibility of certain C-band and L-band optical network components, C-band optical networks can be modified in a cost-effective manner to support both C-band and L-band optical network signals, in accordance with example aspects herein.

Also, it should be noted that the switches and other components of the various embodiments herein can be controlled by one or more local controllers (e.g., the SPMs 516 and/or 517 of FIGS. 5 and 6), or a network controller (not shown), or the like, based on computer programs stored in one or more memories (not shown). The computer programs include software which, when executed by a computer, can effect the method(s) described herein.

In the foregoing description, example aspects of the invention are described with reference to specific example embodiments. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed:

1. A system for routing C-band and L-band optical signals, comprising:
   (a) a C-band subsystem comprising one or more reconfigurable optical add/drop multiplexer (ROADM) modules arranged to select one or more C-band optical signals from a plurality of optical wavelength division multiplexed (WDM) signals received by the C-band subsystem, the C-band subsystem further comprising:
      (i) a plurality of optical switches arranged to select the one or more C-band optical signals from the plurality of optical WDM signals received by the C-band subsystem; and
      (ii) at least one multiplexer arranged to multiplex the one or more C-band optical signals selected by the plurality of optical switches;
   (b) an L-band subsystem comprising one or more ROADM modules arranged to select one or more L-band optical signals from a plurality of optical WDM signals received by the L-band subsystem, the L-band subsystem further comprising:
      (i) a plurality of optical switches arranged to select the one or more L-band optical signals from the plurality of optical WDM signals received by the L-band subsystem; and
      (ii) at least one multiplexer arranged to multiplex the one or more L-band optical signals selected by the plurality of optical switches;
   (c) at least two amplifiers arranged to amplify signals outputted by at least one of the multiplexers;
   (d) a dispersion compensating unit interposed between an output of one of the at least two amplifiers and an input of another of the at least two amplifiers;
   (e) at least one communication path for forwarding signals selected by the C-band and L-band subsystems; and
   (f) a combiner arranged to combine the one or more C-band optical signals and the one or more L-band optical signals selected by the C-band and L-band subsystems.

2. The system of claim 1, wherein at least one of the C-band subsystem and the L-band subsystem includes four ROADM modules.

3. The system of claim 1, wherein at least one of the C-band subsystem and the L-band subsystem further comprises at least one demultiplexing device arranged to demultiplex the optical WDM signals received by the at least one of the C-band subsystem and the L-band subsystem, and provide resulting demultiplexed optical signals to the plurality of optical switches.

4. The system of claim 3, wherein each individual one of the plurality of optical switches selects from optical signals having a same wavelength.

5. The system of claim 4, wherein the plurality of switches select from optical signals having differing wavelengths.

6. The system of claim 1, wherein each of the one or more ROADM modules of the C-band and L-band subsystems has at least one output coupled to at least one corresponding input of each of other ones of the ROADM modules of that subsystem, and also has at least one input coupled to at least one corresponding output of each of the other ones of the ROADM modules of that subsystem.

7. The system of claim 1, wherein each of the one or more ROADM modules is arranged to select at least one optical wavelength signal from among optical signals received by that ROADM module from at least other ones of the ROADM modules.

8. The system of claim 7, wherein each of the one or more ROADM modules is arranged to select the at least one optical wavelength signal, for each of n wavelengths.

9. The system of claim 7, wherein each of the one or more ROADM modules is arranged to select the at least one optical wavelength signal from among both the optical signals received by that ROADM module from at least the other ones of the ROADM modules, and optical signals locally added to the ROADM module.

10. The system of claim 1, wherein each of the one or more ROADM modules is arranged to provide corresponding optical signals to other ones of the ROADM modules.

11. The system of claim 10, wherein each of the one or more ROADM modules comprises at least one coupling device arranged to provide the corresponding optical signals to the other ones of the ROADM modules.

12. The system of claim 10, wherein each of the one or more ROADM modules is arranged to drop optical signals.

13. The system of claim 1, wherein the C-band subsystem and the L-band subsystem are installed in a single rack assembly.

14. The system of claim 1, wherein the one or more C-band optical signals are of a lower bitrate than a bitrate of the one or more L-band optical signals.

15. The system of claim 1, wherein the one or more C-band optical signals are encoded using on-off keying (OOK) and the one or more L-band optical signals are encoded using polarization mode quadrature phase shift keying (PM-QPSK).

16. A method for routing C-band and L-band optical signals, comprising:
   selecting one or more C-band optical signals from a plurality of optical wavelength division multiplexed (WDM) signals received by a C-band subsystem comprising one or more reconfigurable optical add/drop multiplexer (ROADM) modules and a plurality of optical switches arranged to select the one or more C-band optical signals, resulting in one or more selected C-band optical signals;
   multiplexing the one or more selected C-band optical signals, resulting in one or more multiplexed C-band optical signals;
   selecting one or more L-band optical signals from a plurality of optical WDM signals received by an L-band subsystem comprising one or more ROADM modules and a plurality of optical switches arranged to select the one or more L-band optical signals, resulting in one or more selected L-band optical signals;
   multiplexing the one or more selected L-band optical signals, resulting in one or more multiplexed L-band optical signals;
   amplifying at least one of the one or more multiplexed C-band optical signals and the one or more multiplexed L-band optical signals, resulting in one or more amplified optical signals;
   inputting the one or more amplified optical signals into one or more dispersion compensating modules; and
   combining the selected C-band and L-band optical signals.

17. The method of claim 16, further comprising demultiplexing at least one of the plurality of optical WDM signals into the one or more C-band optical signals and the one or more L-band optical signals.

18. The method of claim 16, wherein the one or more C-band optical signals are of a lower bitrate than a bitrate of the one or more L-band optical signals.

19. The method of claim 16, wherein the one or more C-band optical signals are encoded using on-off keying (OOK), and the one or more L-band optical signals are encoded using polarization mode quadrature phase shift keying (PM-QPSK).

20. The method of claim 16, wherein the one or more multiplexed C-band optical signals are amplified and inputted into the one or more dispersion compensating modules and the one or more multiplexed L-band optical signals are not inputted into one or more dispersion compensating modules.

* * * * *